(12) United States Patent
Viswanathan et al.

(10) Patent No.: US 9,191,771 B2
(45) Date of Patent: Nov. 17, 2015

(54) CONVENIENT USE OF PUSH BUTTON MODE OF WPS (WI-FI PROTECTED SETUP) FOR PROVISIONING WIRELESS DEVICES

(71) Applicant: GainSpan Corporation, San Jose, CA (US)

(72) Inventors: Prashant Viswanathan, Bangalore (IN); Vishal Batra, Bangalore (IN); Pankaj Vyas, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 396 days.

(21) Appl. No.: 13/906,364

(22) Filed: May 31, 2013

(65) Prior Publication Data
US 2014/0355579 A1 Dec. 4, 2014

(51) Int. Cl.
*H04W 4/00* (2009.01)
*H04W 12/04* (2009.01)
*H04W 48/20* (2009.01)
*H04L 12/24* (2006.01)
*H04L 12/28* (2006.01)

(52) U.S. Cl.
CPC .............. *H04W 4/001* (2013.01); *H04W 12/04* (2013.01); *H04L 12/2807* (2013.01); *H04L 41/0806* (2013.01); *H04W 48/20* (2013.01)

(58) Field of Classification Search
CPC ..... H04W 12/08; H04W 12/06; H04W 48/16; H04W 48/20; H04W 12/04; H04L 12/2807; H04L 63/0492; H04L 63/20
USPC .................................. 370/338, 254; 715/739
See application file for complete search history.

(56) References Cited

U.S. PATENT DOCUMENTS 6,891,807 B2  5/2005  Roskind et al.
7,120,679 B2  10/2006  Remer
(Continued)

OTHER PUBLICATIONS

Wi-Fi Protected Setup Specification Version 1.0h, http://gpl.back2roots.org/source/puma5/netgear/CG3200-1TDNDS_GPL/ap/apps/wpa2/original/Wi-Fi%20Protected%20Setup%20Specification%201.0h.pdf, Date Dec. 2006, pp. 1-110.
(Continued)

*Primary Examiner* — Brian O'Connor
*Assistant Examiner* — Lionel Preval
(74) *Attorney, Agent, or Firm* — Iphorizons PLLC; Narendra Reddy Thappeta

(57) ABSTRACT

An access point (AP) in accordance with an aspect of the present disclosure provides a convenient approach to provision wireless devices. In an embodiment, the AP initiates push button mode of WPS procedures with a wireless device, in response to receiving of a provisioning request from the wireless device, without requiring a WPS push button signal locally. The AP thereafter operates to complete provisioning of the wireless device. According to yet another aspect of the present disclosure, a wireless device may also participate in push button mode of WPS, without requiring a push button signal locally. In an embodiment, a wireless device automatically transmits a request for provisioning. An AP within the transmission range, responds back with a command to initiate push button mode of WPS procedures. The wireless device communicates with the AP to complete provisioning.

18 Claims, 6 Drawing Sheets

(56) References Cited

U.S. PATENT DOCUMENTS

| | | |
|---|---|---|
| 7,240,106 B2 | 7/2007 | Cochran et al. |
| 7,752,345 B2 | 7/2010 | Duckett |
| 7,808,963 B2 | 10/2010 | Gupta et al. |
| 7,974,236 B2 | 7/2011 | Woo |
| 2007/0157024 A1 | 7/2007 | Miller |
| 2009/0271709 A1* | 10/2009 | Jin ................. H04W 12/08 715/739 |
| 2009/0274065 A1* | 11/2009 | Jin ................. H04W 12/04 370/254 |
| 2010/0165879 A1 | 7/2010 | Gupta et al. |
| 2012/0214414 A1 | 8/2012 | Abel et al. |

OTHER PUBLICATIONS

DIPL.-ING. (BA) Alexander Gutjahr, DR.-ING. Axel Sikora, Autonomous commissioning for headless embedded networking devices, http://www.stzedn.de, downloaded circa Mar. 6, 2013, pp. 1-10.

T. Saito, I. Tomoda, Y. Takabatake, K. Teramoto, K. Fujimoto, Wireless gateway for wireless home AV network and its implementation, Consumer Electronics, IEEE Transactions, date Aug. 2001, pp. 496-501, vol. 47, Issue: 3, IEEE Consumer Electronics Society.

* cited by examiner

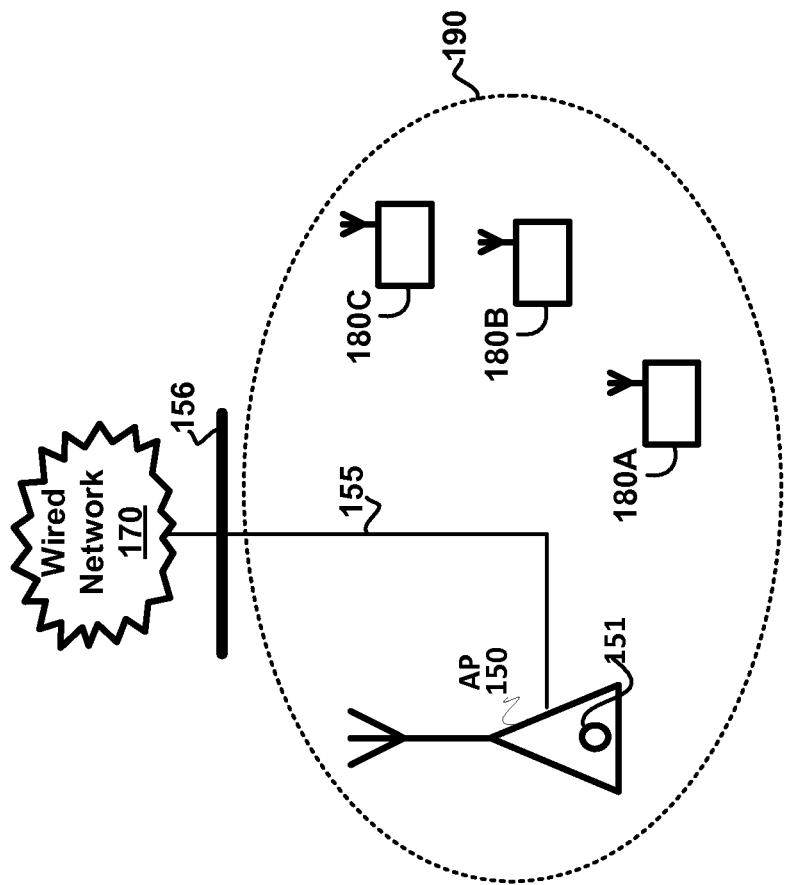
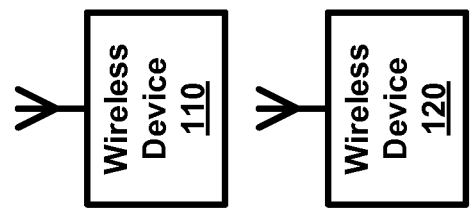
*FIG. 1*

CONVENIENT USE OF PUSH BUTTON MODE OF WPS (WI-FI PROTECTED SETUP) FOR PROVISIONING WIRELESS DEVICES

BACKGROUND

1. Technical Field

Embodiments of the present disclosure relate generally to wireless networks, and more specifically to convenient use of push button mode of WPS (Wi-Fi Protected Setup) for provisioning wireless devices.

2. Related Art

WLAN (Wireless local area network) technology is used at locations such as homes to facilitate communication capability for various wireless devices. In general, a WLAN environment contains an access point (AP), which receives packets from one wireless device and forwards the packet to or towards a target device, thereby operating as a switching device.

There has been recognized a general need to implement secure communication between wireless devices and APs, or between wireless device and other systems on a wired network via an AP. Secure communication implies features such as preventing malicious or unintended wireless devices from communicating via an AP, and also ensuring that third parties cannot decipher the packet content by snooping on the wireless medium.

A wireless device generally needs to be provisioned before being able to communicate with other devices via an AP implementing various security measures. Provisioning normally entails configuring (e.g., storing at appropriate locations) the wireless device with various parameters that enable the wireless device to comply with the security measures enforced by the AP. In many WLAN environments the parameters include SSID (Service set identification) of the network and a passphrase, as is well known in the relevant arts.

WPS (Wi-Fi Protected Setup) is a standard defined by the Wi-Fi Alliance™, that has been adopted by many vendors of APs and wireless devices, to simplify configuration of a new wireless device in a wireless network at locations such as homes. A push-button mode is one of the approaches defined by WPS, in which a user is normally required to press respective buttons of an AP and a new wireless device (enrollee) within a short duration (typically 2 minutes) such that the AP (or other device operating as a registrar) can automatically provide the configuration information/parameters to the wireless device.

There may be situations in which it is desirable that such provisioning be made convenient, as suitable in corresponding environments.

BRIEF DESCRIPTION OF THE VIEWS OF DRAWINGS

Example embodiments of the present disclosure will be described with reference to the accompanying drawings briefly described below.

FIG. 1 is a block diagram representing an example environment in which several aspects of the present disclosure can be implemented.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 2:
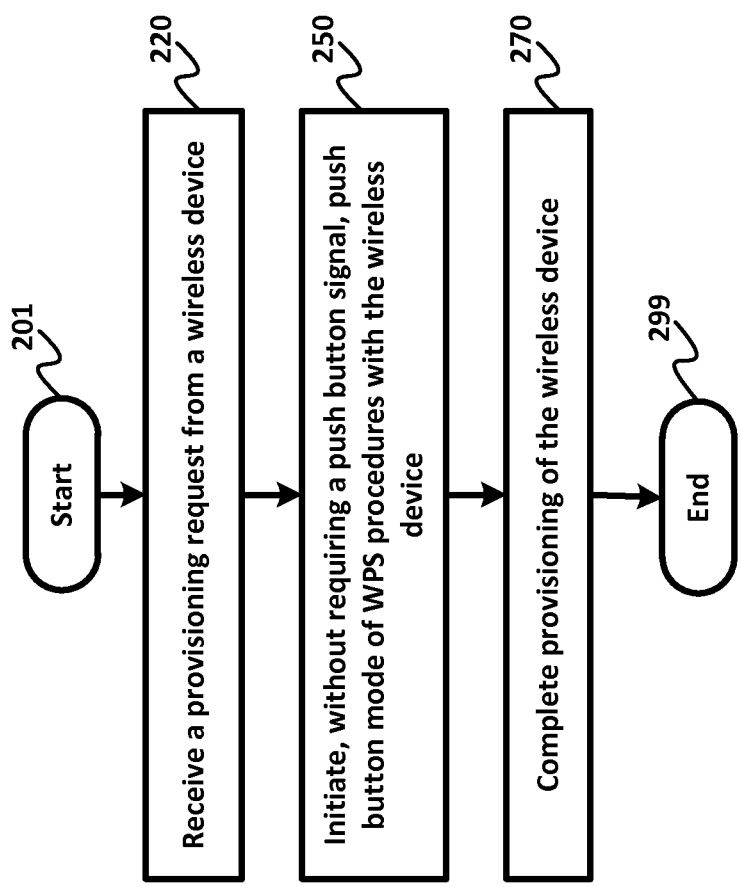
FIG. 2 is a flowchart illustrating the manner in which a wireless device is provisioned according to WPS push button mode without requiring a push button signal, in an embodiment.

An access point (AP) in accordance with an aspect of the present disclosure provides a convenient approach to provision wireless devices. In an embodiment, the AP initiates push button mode of WPS procedures with a wireless device, in response to receiving of a provisioning request from the wireless device, without requiring a WPS push button signal locally. The AP thereafter operates to complete provisioning of the wireless device.

According to another aspect of the present disclosure, an AP maintains an override data, which is configurable. The override data indicates whether or not the access point should initiate the push button mode of WPS without requiring a local push button signal. If the override signal indicates that the access point should not initiate the push button mode of WPS without requiring the push button signal (locally), the access point waits for a pre-specified duration for the local push button signal, and initiates WPS procedures only if the local push button signal is received within the pre-specified duration.

According to yet another aspect of the present disclosure, a wireless device may also participate in push button mode of WPS, without requiring a push button signal locally. In an embodiment, a wireless device automatically transmits a request for provisioning. An AP within the transmission range, responds back with a command to initiate push button mode of WPS procedures. The wireless device communicates with the AP to complete provisioning.

In view of such completion of provisioning, the wireless device may thereafter communicate securely with the AP.

Several aspects of the disclosure are described below with reference to examples for illustration. It should be understood that numerous specific details, relationships, and methods are set forth to provide a full understanding of the disclosure. One skilled in the relevant arts, however, will readily recognize that the disclosure can be practiced without one or more of the specific details, or with other methods, etc. In other instances, well-known structures or operations are not shown in detail to avoid obscuring the features of the disclosure.

2. Example Environment

FIG. 1 is a block diagram representing an example environment in which several aspects of the present disclosure can be implemented. The example environment is shown containing only representative systems for illustration. However, real world environments may contain more or fewer systems. FIG. 1 is shown containing wireless devices 110 and 120, access point (AP) 150, WLAN wireless stations (or clients) 180A-180C, wired network backbone 156, and wired network 170. Block 190 represents a basic service set (BSS) consistent with the IEEE 802.11 standard(s). Other environments may include more than one BSS, with the BSSs being interconnected to form an extended service set (ESS) consistent with IEEE 802.11 standards.

Each of clients 180A-180C is designed to operate as wireless stations consistent with IEEE 802.11 family of standards (including IEEE 802.11a, 802.11b, 802.11g and 802.11n), and may communicate, via AP 150, with each other as well as with devices/systems on wired network 170. It is assumed that clients 180A-180C are already provisioned to communicate securely via AP 150. Clients 180A-180C may correspond, for example, to laptop computers, smart phones, or wireless sensors.

AP 150 represents a switch/hub operating according to IEEE 802.11 family of standards, and enables associated wireless stations (e.g., 180A-180C) to communicate with each other as well as with systems connected to wired network 170. AP 150 is connected by a wired medium (155) to wired network backbone 156, and thus to wired network 170. Wired network 170 may represent the internet, also known as the World Wide Web. AP 150 is shown containing WPS push button 151 merely for understanding of some of the concepts, though embodiments in accordance with the present disclosure can be implemented without push button 151.

Wireless devices 110 and 120 represent devices that are capable of communicating wirelessly according to IEEE 802.11 (WLAN) standards, and operate as wireless stations (clients). Each of wireless devices 110 and 120 may have a core functionality (e.g., operation as a smart meter, sensor, etc), and secure wireless communication capability according to IEEE 802.11 can be used to communicate various data and control parameters of interest with other devices via an AP (for example, AP 150).

However, before wireless devices 110 and 120 can communicate securely, wireless devices 110 and 120 may need to be provisioned. As noted above, provisioning generally entails configuring the wireless devices with various parameters that enable the wireless devices to comply with the security measures enforced by an AP, in addition to specifying the particular AP with which to associate and thereafter communicate with other devices. The configuration parameters include SSID (Service Set Identification) of the network and a passphrase, as is well known in the relevant arts.

WPS push button mode is one approach according to which wireless devices 110 and 120 can be provisioned. According to the WPS push button mode, a user presses corresponding WPS push buttons on an AP and the wireless device to be provisioned. Thus, for example assuming wireless device 110 is required to associate with AP 150 and be provisioned by AP 150, a user would need to press push button 151 and a corresponding push button on wireless device 110. However, wireless device 110 (and device 120) may either be headless devices (not having, or having minimal user interface such that a push button for WPS is not available), or be located such that access to a WPS push button is difficult even when such a push button is provided. Further, even though AP 150 is noted as having a WPS push button 151, it may be desirable to provide WPS push button mode of provisioning without a user having to press WPS push button 151.

The manner in which a wireless device is provisioned conveniently is illustrated next with respect to a flowchart.

3. Provisioning without Requiring Pressing of a WPS Push Button

FIG. 2 is a flowchart illustrating the manner in which a wireless device is provisioned according to WPS push button mode without requiring a push button signal, in an embodiment. The flowchart is described with respect to the environment of FIG. 1 and access point 150, merely for illustration. However, various features described herein can be implemented in other devices/environments, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein. The flowchart starts in step 201, in which control passes immediately to step 220.

In step 220, access point 150 receives a provisioning request from a wireless device. The provisioning request may be received, for example, when wireless device is powered up (without requiring user intervention), or upon a user pressing a button provided locally on the wireless device. The request is received in the form of a packet, according to any pre-specified convention. Some example conventions are described in sections below.

In step 250, access point 150 initiates push button mode of WPS procedures with the wireless device, in response to receiving of the provisioning request, without requiring a local push button signal. Such initiating implies that access point 150 is ready to exchange WPS messages, and also communicates to the wireless device to start participating in the exchange of WPS messages.

Thus, the provisioning request of step 220 operates as a trigger to initiate the push button mode of WPS. Not requiring a push button signal implies that there is no need for a user to press the push button (if one is present) on AP 150 or other equivalent actions equivalent of pushing such a button on AP 150 for the purpose of initiating WPS procedures in the AP.

The WPS procedures cause packets to be exchanged between access point 150 and wireless device 110, thereby completing provisioning of the wireless device in step 270. Once the setup procedures are initiated in step 250 according to an aspect of the present disclosure, such provisioning may be performed in a known way. The flowchart ends in step 299.

After the completion of provisioning, wireless device 110 is termed as being 'enrolled' with BSS 190, and can securely communicate (exchange data packets), via AP 150, with other wireless devices in BSS 190 and devices connected to wired network 170. Such secure communication implies that the packets in the wireless medium are encrypted, and the decryption is based on the secure credentials exchanged during provisioning.

The capability of AP 150 to initiate WPS push button mode procedures without requiring a WPS push button signal may be advantageous in several environments. One example environment is when an 'acceptable' level of trust exists and administrators at a location are comfortable with provisioning in the absence of push-button based confirmations.

The description is continued with an illustration of the messages that are exchanged between a wireless device and AP 150 in provisioning the wireless device, in an embodiment.

4. Messages

Figure 3:
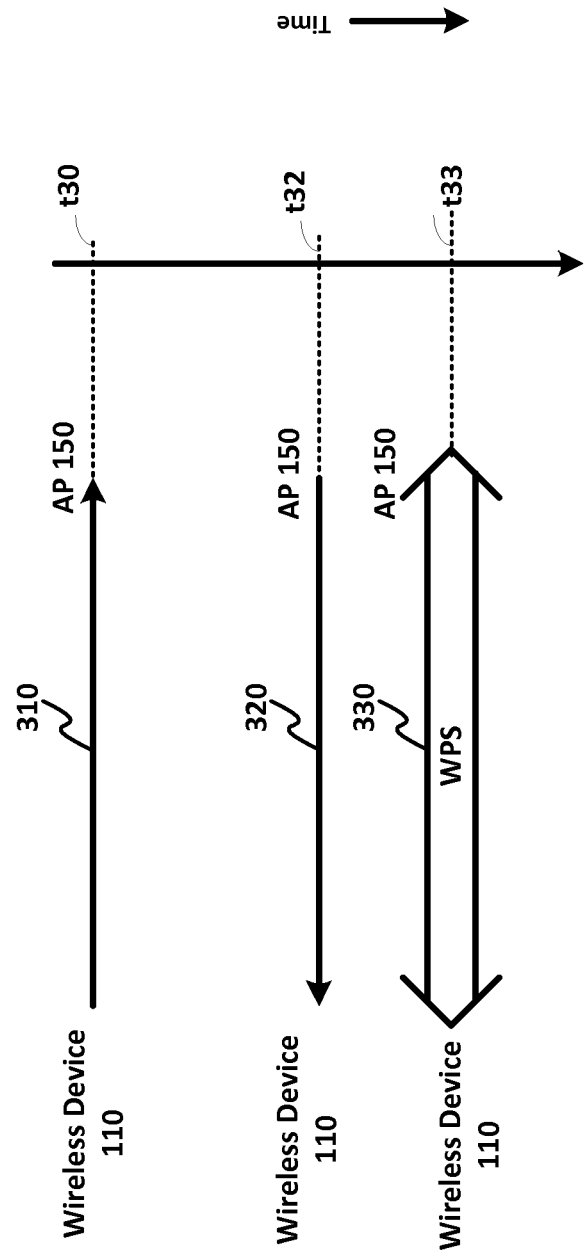
FIG. 3 is a diagram illustrating the sequence of messages exchanged between an access point and a wireless device in provisioning the wireless device, in an embodiment.

FIG. 3 is a diagram illustrating the sequence of messages exchanged (in an embodiment) between AP 150 and wireless device 110 in provisioning wireless device 110 as described above with respect to flowchart of FIG. 2. Merely for illustration, the description below is provided with respect to wireless device 110. However, the description applies to provisioning of wireless device 120 as well, and in general to provisioning of multiple wireless devices.

Furthermore, wireless device 110 is assumed to be a headless device, i.e., with no or minimal user interface capabilities. It may accordingly be desirable to dispense with push button requirements for initiation of the push button mode of WPS procedures.

At time instant t30, wireless device 110 transmits message 310, with message 310 being a request to be provisioned (step 210). The transmitting of message 310 may also be performed without requiring any push buttons to be pressed on wireless device 110 or without the receipt, in wireless device 110, of equivalent signals from external units. In an embodiment, wireless device 110 automatically transmits message 310 on power-up (after determining the presence and identity of a corresponding AP to which to transmit message 310, as described below).

In response to the receipt of message 310 (which implies that AP 150 is within transmission/communication range of wireless device 150) and at t32, AP 150 transmits message 320 to wireless device 110. AP 150 itself also initiates WPS procedures according to WPS push button mode. Messages 310 and 320 operate to coordinate initiation of WPS procedures on both AP 150 and wireless device 110.

Initiation by AP 150 of push button mode of WPS procedures occurs without requiring a push button signal (in the form, for example, of pressing of WPS push button 151), provided that an override data stored in AP 150 (as described below) indicates that AP 150 may do so.

Thus, no user-intervention (e.g., by way of pressing a push button) is required to occur in the 2 minute duration prior to time instant t33, and yet AP 150 provisions wireless device 110. This is in contrast to the normal operation of push button mode of WPS described in Wi-Fi Protected Setup Specification, Version 1.0h, December 2006, published by the WiFi™ Alliance, which requires AP 150 to have a push button and that the button be pressed within 2 minutes prior to exchange of WPS packets.

Thus, commencing at t33 (and as a consequence of initiation of WPS procedures on each of wireless device 110 and AP 150), wireless device 110 and AP 150 exchange a sequence of eight messages M1-M8 (represented as 330 in FIG. 3) to perform WPS provisioning to cause wireless device 110 to be enrolled with AP 150. The packets exchanged are described in section 6.2. 'Registration Protocol Messages' of the above-referenced Wi-Fi Protected Setup Specification. The end of the exchange of messages M1-M8 (330) occurs at some time point later than t33, but is not indicated in FIG. 3.

Thus, WPS push button procedures take place identical to the manner in which such procedures would have occurred when corresponding WPS push buttons (when present) are pressed in respective devices AP 150 and wireless device 110.

During the exchange of messages M1-M8 (330), AP 150 provides to wireless device 110 the SSID of the network (BSS 190) as well as the passphrase from which to derive encryption/decryption keys for encrypting/decrypting subsequent communication between wireless device 110 and AP 150. With provisioning being complete, wireless device 110 becomes a part of BSS 190 (although not indicated as such in FIG. 1), and may commence communication with other devices in BSS 190 and/or external devices (such as those that may be present in wired network 170). However, if provisioning is unsuccessful, wireless device 110 does not become part of BSS 190, AP 150 may signal (in a manner similar to message 320) wireless device 110 to attempt initiating WPS again, and exchange of messages M1-M8 may be attempted again.

Thus, the exchange of the messages 310, 320 and 330 of FIG. 3, and therefore WPS push button mode provisioning of wireless device 110, take place without a user having to press push buttons either on AP 150 or wireless device 110.

In an embodiment, a not-yet-provisioned device such as wireless device 110 powers-up as a wireless station, and scans the various channels/bands allotted for WLAN operation for the presence of a compatible AP, which is capable of participating with wireless device 110 in push button mode of WPS. Wireless device 110 may recognize a compatible AP based on information contained in vendor-specific information element (IE) of a beacon received from the AP during the scan noted above. Alternatively, such information may be conveyed by the AP in IE of other types of frames, such as probe response frames.

After identifying a compatible AP (e.g., AP 150), wireless device 110 sends message 310, which is a probe request frame as defined by the WLAN standard, and the request for provisioning is indicated in a vendor-specific information element (IE) of the probe request frame 310. Probe request frame format is described in detail in section 7.2.3.8 "Probe Request frame format" of IEEE Std 802.11™-2007 available from IEEE. Vendor-Specific IE is described in section 7.3.2.26 "Vendor Specific information element" of IEEE Std 802.11™-2007 available from IEEE.

Figure 4:
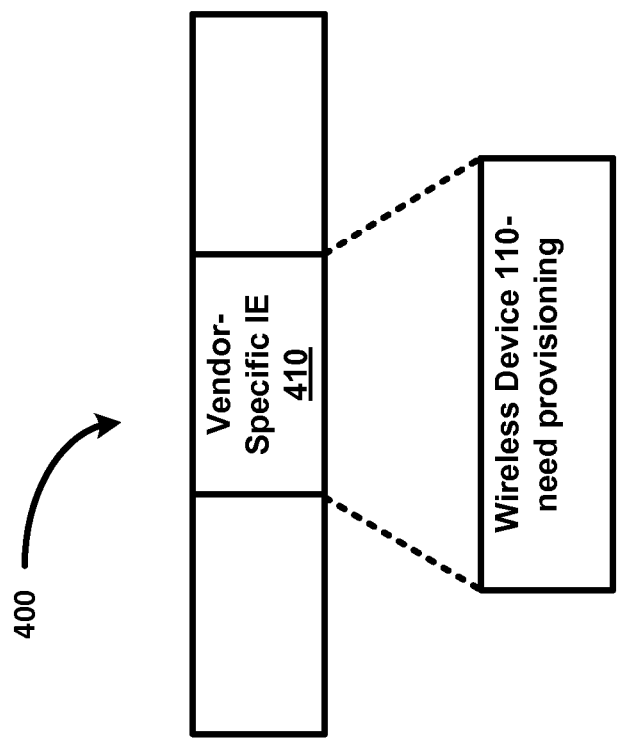
FIG. 4 is a diagram showing a portion of a message transmitted by a wireless device requesting to be provisioned, in an embodiment.

FIG. 4 is a diagram depicting a portion of a probe request frame 400 (which corresponds to message 310 of FIG. 3) transmitted by wireless device 110 to AP 150. Field 410 represents a vendor-specific information element field in message 400. In the example request of FIG. 4, field 410 is shown as containing the text "Wireless Device 110—need provisioning", which specifies (to AP 150) that wireless device 110 is requesting for being provisioned. The message, being proprietary, also indicates to AP 150 that wireless device 110 is a 'compatible' device (e.g., made by the same manufacturer as AP 150).

AP 150 receives message 400 transmitted by wireless device 110. AP 150 parses field 410 and determines that wireless device 110 is requesting to be provisioned.

Figure 5:
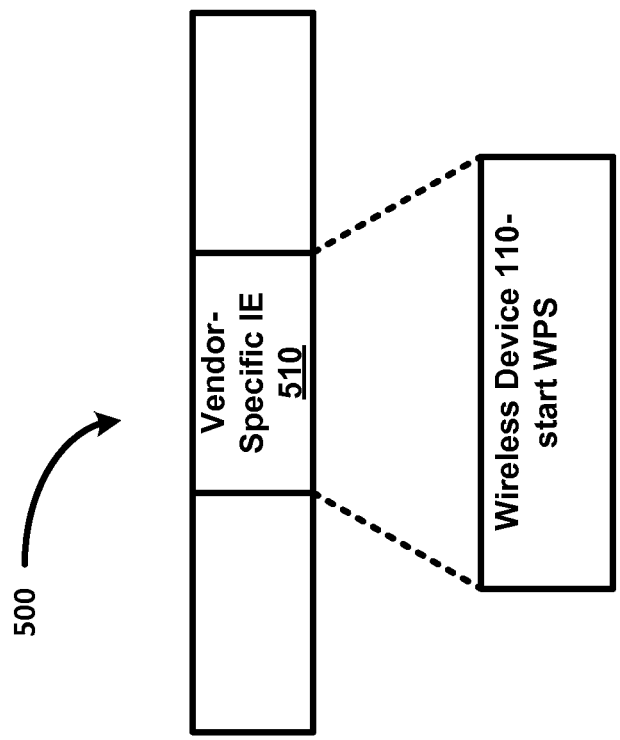
FIG. 5 is a diagram showing a portion of a message transmitted by an access point to a wireless device which has requested to be provisioned, in an embodiment.

In response to receipt of message 400, AP 150 transmits to wireless device 110 a probe response frame 500 (which corresponds to message 320 of FIG. 3) according to the WLAN standard. Probe response frame format is described in detail in section 7.2.3.9 Probe Response frame format of IEEE Std 802.11™-2007 available from IEEE. Prior to transmission of frame 500, AP 150 enters the text "Wireless Device 110—start WPS" in a vendor specific information element (IE) field 510 of probe request frame 500, as shown in FIG. 5. Subsequently, AP 150 and wireless device 110 exchange messages 330, as noted above.

In an embodiment, AP 150 scans the WLAN channels to compile a list of all wireless devices (such as devices 110 and 120) seeking provisioning in the manner described above. Optionally, AP 150 then presents the list to a user (e.g., on a display (not shown) on AP 150), the user then selecting the specific ones of the wireless devices that the user wishes to be provisioned. Subsequently, AP 150 sequentially commands the user-selected wireless devices to initiate WPS push button mode (in the manner noted above with respect to message 320), AP 150 itself also initiating WPS each time without requiring a push button signal to do so (provided that the override data allows the AP 150 to do such initiating).

Thus, one or more wireless devices can be conveniently provisioned.

The description is continued with an illustration of the internal blocks of AP 150, in an embodiment.

5. Access Point

Figure 6:
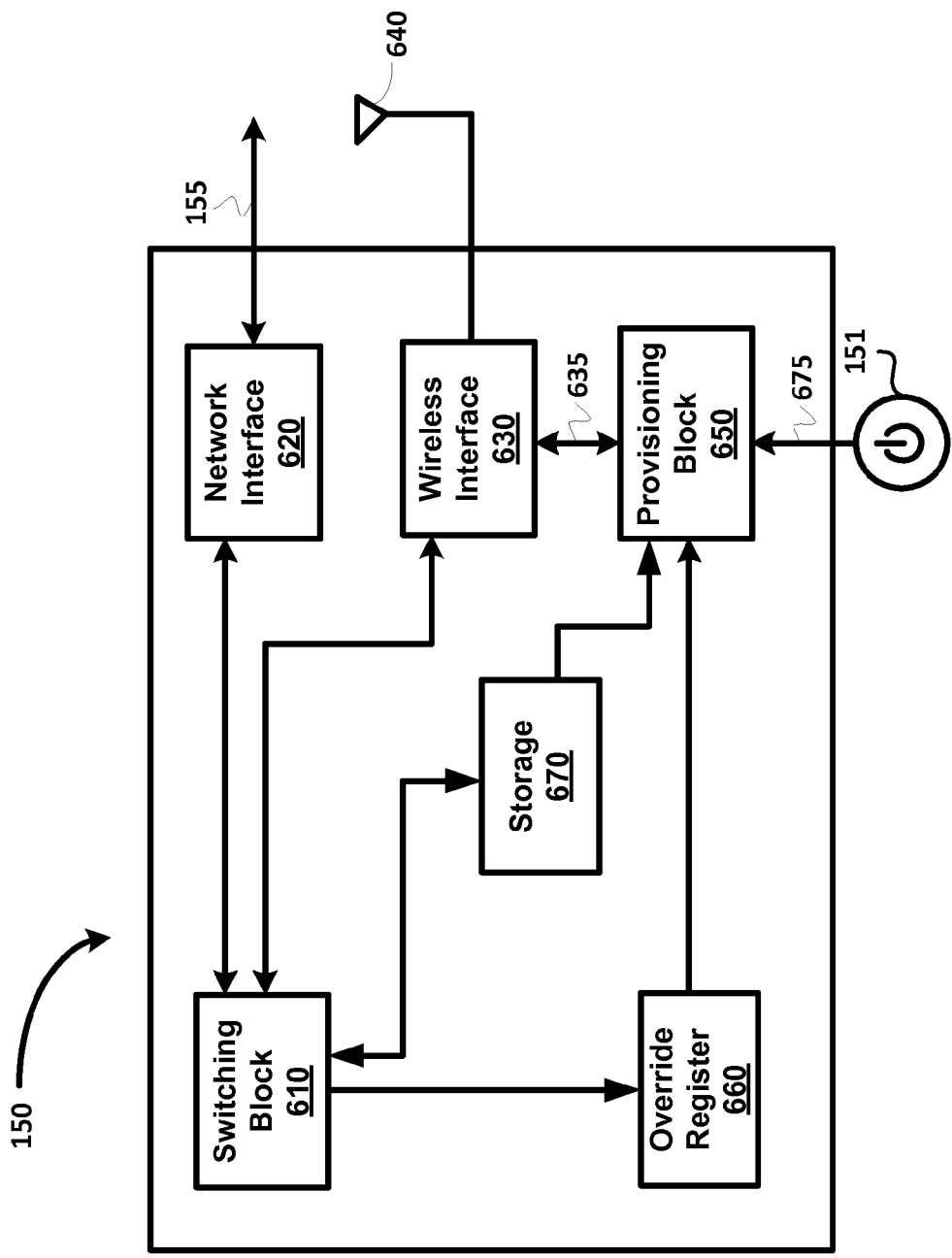
FIG. 6 is a diagram illustrating the internal details of an access point in an embodiment.

FIG. 6 is a block diagram illustrating the internal blocks of AP 150, in an embodiment. AP 150 is shown containing switching block 610, network interface 620, wireless interface 630, antenna 640, provisioning block 650, override register 660, storage 670, and push-button 151.

Network interface 620 provides connectivity to a network (e.g., using Internet Protocol), and may be used to enable AP 150 as well as wireless devices in BSS 190 to communicate (via path 155) with other systems connected to wired network 170 of FIG. 1. Wireless interface 630 provides the hardware, software and firmware that enable AP 150 to communicate wirelessly (via antenna 650) according to IEEE 802.11 standards.

Override register 660 stores a value/data ("override data") indicating whether or not a local push button signal is required to initiate WPS procedures. The value may be set by users using any suitable user interface. For example, switching block 610 may provide a web page via network interface 620, using which a user can specify an appropriate value. Switching block 610 may store the value/data provided stored in override register 660.

Alternatively, or in addition, an "Enable Group WPS provisioning" button may be provided, which upon being pressed according to a pre-specified convention causes the override data to be set to a value indicating that the local push button signal is not required to initiate WPS procedures, as described in sections above. The group provisioning button and WPS push button may be implemented using a same button, but with the button being required to be pressed for a longer duration to enable the group provisioning described above. Though shown as a separate block, the register may be integrated into storage 670.

Storage 670 contains both the volatile and non-volatile storage required for operation of various blocks. The non-volatile storage may be used to store the SSID of BSS 190 and security credentials (which may include a passphrase) which may need to be provided/transmitted to a wireless device that is to be provisioned. Storage 670 may store the encrypt/decrypt keys that would be required to encode/decode data transmitted to/received from each of the wireless stations provisioned using AP 150. The passphrase is typically the same for all wireless stations in the network. However, according to 802.11 standards, the encrypt/decrypt keys, which are derived from the passphrase, are typically different for each wireless device. The non-volatile memory may also store various instructions. The volatile memory contains randomly accessible locations that are used for storing data/instructions, which are used during operation of AP 150.

Provisioning block 650 operates to enable provisioning of wireless devices. Provisioning block 650 is shown receiving push button signal when button 151 is operative. The push button signal thus generated locally is effective when override register 660 indicates that local push button signal is required to initiate WPS procedures. In particular, as explained above, in accordance with the operation of push button mode of WPS, a similar button is to be pressed on a wireless device (sought to be provisioned) within two minutes of pressing of button 151 to cause provisioning of the wireless device.

However, in accordance with an aspect of the present disclosure, when override register 660 indicates that local push button signal is not required, provisioning block 650 (in conjunction with wireless interface 630) performs steps 250 and 270 of the flowchart of FIG. 2 without waiting for push button 151 to be pressed, and in response to receiving a provisioning request from a wireless device. In other words, in this scenario, the state of operation of button 151 is immaterial or irrelevant.

Provisioning block 650 accordingly examines override register 660 to determine which of the two modes of above to operate in. If the override data stored in override register 660 indicates that local push button signal is required, then provisioning block 650 waits for a pre-specified duration of time (from the receipt of provisioning request of step 220), and initiates push button mode of WPS only if an indication is received that a similar local push button signal (on access point) is generated in the pre-specified duration.

Irrespective of the mode of operation, provisioning block 650 retrieves the SSID and security credentials (noted above) from storage 670, and causes the SSID and security credentials to be transmitted to the wireless device via wireless interface 630.

Switching block 610 operates to provide the features of an access point according to IEEE 802.11 standards. Thus, in conjunction with wireless interface 630, switching block 610 may broadcast beacon frames, receive data packets from one wireless station and forward the packets with the corresponding address of another wireless station, etc, as required by an access point. Switching block 610 decodes each received packet using the keys derived from the security credentials previously sent to the specific source wireless station from which the packet is received. The content may again be encrypted using the keys derived from the security credentials previously sent to the target wireless station to which the received packet is to be delivered.

Switching block 610 thus enables associated wireless stations to communicate with each other. Switching block 610, in conjunction with network interface 620, enables wireless devices associated with AP 150 to communicate with devices on wired networks such as wired network 170 (shown in FIG. 1). Switching block 610 may use the randomly accessible portion of storage 670 to store (and later retrieve) temporary data.

It should be appreciated that AP 150 can be enabled with the features described above as a desired combination of one or more of hardware, executable modules, and firmware. The implementation details of AP 150 are described next with respect to an example embodiment in which various features are operative when the corresponding executable modules are executed.

6. Digital Processing System

Figure 7:
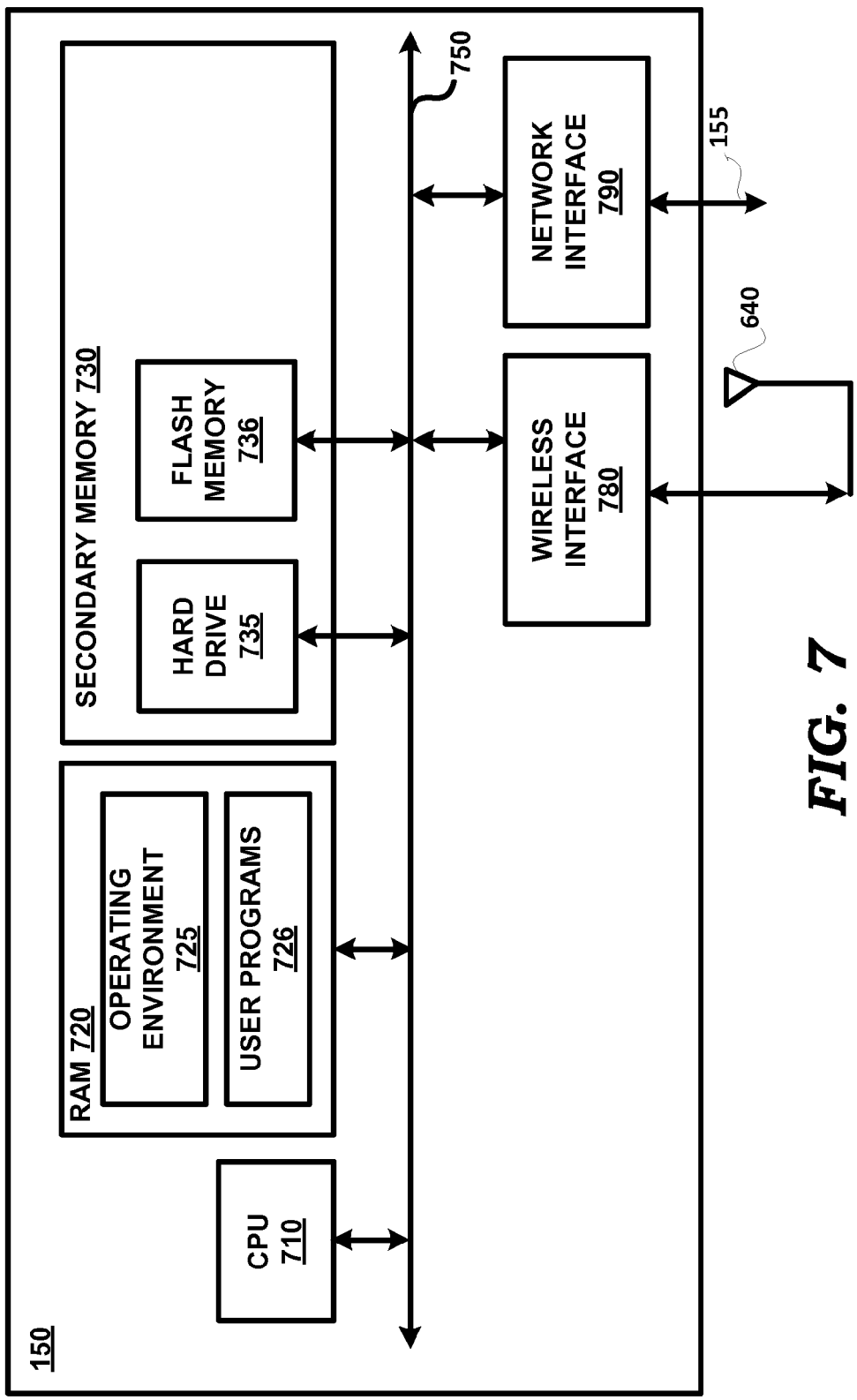
FIG. 7 is a block diagram illustrating the details of an access point in an embodiment in which various aspects of the present disclosure are operative by execution of appropriate executable modules.

FIG. 7 is a block diagram illustrating the details of AP 150 in an embodiment in which various aspects of the present disclosure are operative by execution of appropriate executable modules. AP 150 may contain one or more processors such as a central processing unit (CPU) 710, random access memory (RAM) 720, secondary memory 730, wireless interface 780 and network interface 790. All the components may communicate with each other over communication path 750, which may contain several buses as is well known in the relevant arts.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 (non-transitory/non-volatile machine readable storage medium) via communication path 750. RAM 720 is shown currently containing software instructions constituting operating environment 725 and/or other code/user programs 726. In addition to operating system 725, RAM 720 may contain other software programs such as device drivers, etc., which provide a (common) run time environment for execution of code/programs/applications (in the form of execution entities).

Secondary memory 730 is shown containing hard drive 735 and flash memory 736. Secondary memory 730 stores data and software instructions (code), which enable AP 150 to provision wireless devices in accordance with the present disclosure. In addition, secondary memory 730 may contain code to enable wireless device 110 to communicate with other devices, and provide user-level features as well. The software instructions (and additionally data) may either be copied to RAM 720 prior to execution by CPU 710, or may be executed directly from flash memory 736. Switching block 610 and provisioning block 650 of FIG. 6 may be contained in the software instructions (code) stored in secondary memory 730. Override register 660 of FIG. 6 may either be an internal register in CPU 710 or be a storage location in secondary memory 730.

Wireless interface 780 and network interface 790 correspond respectively to wireless interface 630 and network interface 620 of FIG. 6.

7. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method of provisioning a wireless device for communication, said method being performed in an access point, said method comprising:
    receiving a provisioning request from said wireless device;
    examining an override data to check whether push button mode of WPS (Wi-Fi Protected Setup) can be initiated without requiring a WPS push button signal locally;
    initiating push button mode of WPS procedures with said wireless device, without requiring said WPS push button signal locally, wherein said initiating is performed in response to said provisioning request only if said override data indicates that push button mode of WPS can be initiated without requiring said WPS push button signal; and
    completing provisioning of said wireless device, wherein multiple wireless devices are provisioned without requiring said WPS push button signal locally upon receiving corresponding provisioning requests if said override data indicates that push button mode of WPS can be initiated without requiring said WPS push button signal.

2. The method of claim 1, wherein said override data is set based on a user interface provided to a user.

3. The method of claim 1, wherein said provisioning request is received in a vendor specific information element field of a probe request frame transmitted by said wireless device.

4. The method of claim 1, wherein said initiating includes triggering said wireless device to also initiate push button mode of WPS procedures,
    wherein messages exchanged between said access point and said wireless device during said WPS procedures are identical to those that occur when WPS procedures are invoked by pressing of corresponding push buttons.

5. The method of claim 4, wherein said triggering is achieved by transmitting a probe response frame from said access point to said wireless device, wherein a vendor specific information element field in said probe response frame contains information specifying that said wireless device should initiate WPS procedures.

6. The method of claim 1, wherein said provisioning request is transmitted by said wireless device without requiring any push button to be pressed on said wireless device.

7. The method of claim 1, further comprising:
    if said override data indicates that push button mode of WPS can be initiated only upon receipt of said WPS push button signal, then waiting for said WPS push button signal for a pre-specified duration from receipt of said provisioning request; and
    performing said initiating and said completing only if said WPS push button signal is received within said pre-specified duration.

8. A non-transitory machine readable storage medium storing one or more sequences of instructions for provisioning a wireless device for communication with an access point, wherein execution of said one or more sequences of instructions by one or more processors contained in said access point enables said access point to perform the actions of:
    receiving a provisioning request from said wireless device;
    examining an override data to check whether push button mode of WPS (Wi-Fi Protected Setup) can be initiated without requiring a WPS push button signal locally;
    initiating push button mode of WPS procedures with said wireless device, without requiring said WPS push button signal, wherein said initiating is performed in response to said provisioning request only if said override data indicates that push button mode of WPS can be initiated without requiring said WPS push button signal; and
    completing provisioning of said wireless device,
    wherein multiple wireless devices are provisioned without requiring said WPS push button signal locally upon receiving corresponding provisioning requests if said override data indicates that push button mode of WPS can be initiated without requiring said WPS push button signal.

9. The non-transitory machine readable storage medium of claim 8, wherein if said override data indicates that push button mode of WPS can be initiated only upon receipt of said WPS push button signal, said access point waits for said WPS push button signal for a pre-specified duration, and performs said initiating and said completing only if said WPS push button signal is received within said pre-specified duration.

10. The non-transitory machine readable storage medium of claim 8, wherein said provisioning request is received in a vendor specific information element field of a probe request frame transmitted by said wireless device.

11. The non-transitory machine readable storage medium of claim 8, wherein said initiating includes triggering said wireless device also to initiate push button mode of WPS procedures,
   wherein messages exchanged between said access point and said wireless device during said WPS procedures are identical to those that would occur when WPS procedures are invoked by pressing of corresponding push buttons.

12. The non-transitory machine readable storage medium of claim 11, wherein said triggering is achieved by transmitting a probe response frame from said access point to said wireless device, wherein a vendor specific information element field in said probe response frame contains text specifying that said wireless device should initiate WPS procedures.

13. An access point to provision wireless devices, said access point comprising:
   an override memory to store data indicating whether or not said push button mode of WPS (Wi-Fi Protected Setup) can be initiated without requiring a WPS push button signal locally in said access point;
   a wireless interface enabled to receive a provisioning request from a wireless device; and
   a provisioning block enabled to initiate push button mode of WPS procedures with said wireless device, without requiring a WPS push button signal locally, and to complete provisioning of said wireless device;
   wherein said provisioning block examines said override register and initiates said push button mode of WPS procedures in response to said provisioning request only if said override data indicates that push button mode of WPS can be initiated without requiring said WPS push button signal,
   wherein said access point provisions multiple wireless devices without requiring said WPS push button signal locally upon receiving corresponding provisioning requests if said override data indicates that push button mode of WPS can be initiated without requiring said WPS push button signal.

14. The system of claim 13, wherein if said override data indicates that push button mode of WPS cannot be initiated without receipt of said WPS push button signal, said provisioning block waits for said WPS push button signal for a pre-specified duration starting from receipt of said provisioning request, and
   initiates push button mode of WPS procedures only if said WPS push button signal is received within said pre-specified duration.

15. The system of claim 13, wherein said wireless interface receives said provisioning request in the form of a probe request frame, wherein said wireless interface forwards said probe request frame to said provisioning block,
   wherein said provisioning block inspects a vendor specific information element field of said probe request frame to determine whether or not said wireless device has requested said provisioning request.

16. The system of claim 13, wherein said wireless interface, on command from said provisioning block, is further enabled to trigger said wireless device to also initiate push button mode of WPS procedures,
   wherein messages exchanged between said access point and said wireless device during said WPS procedures are identical to those that occur when WPS procedures are invoked by pressing of corresponding push buttons.

17. The system of claim 16, wherein in response to receiving said provisioning request, said provisioning block generates a probe response frame with a vendor specific information element field containing text specifying that said wireless device should initiate WPS procedures,
   wherein said wireless interface receives said probe response frame from said provisioning block, and transmits said probe response frame to said wireless device.

18. The system of claim 13, wherein said wireless device transmits said provisioning request without requiring push button to be pressed locally on said wireless device.

* * * * *